Patented Aug. 23, 1927.

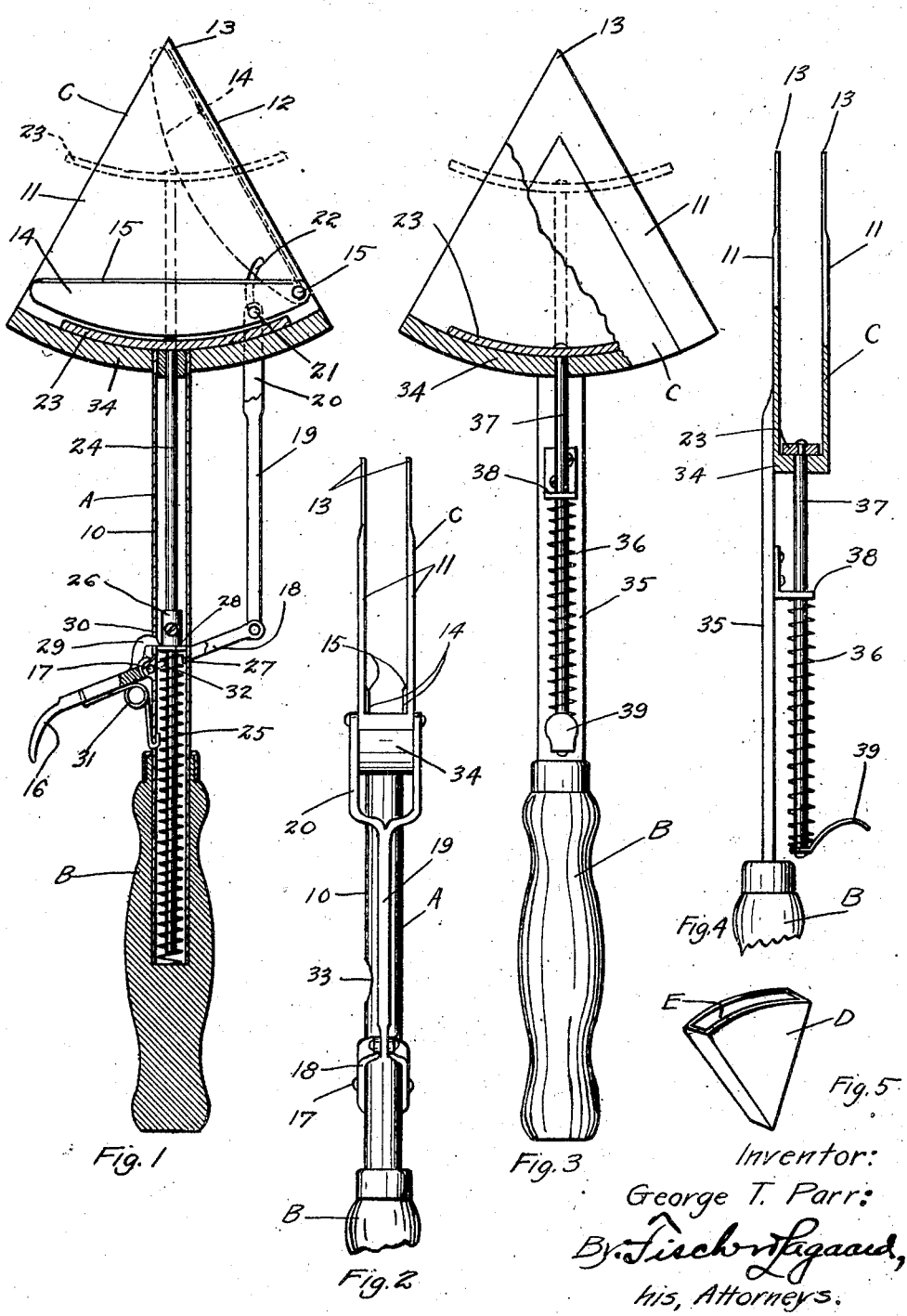

1,639,809

UNITED STATES PATENT OFFICE.

GEORGE T. PARR, OF ST. PAUL, MINNESOTA, ASSIGNOR TO PARR PIE COMPANY, A CORPORATION OF MINNESOTA.

ICE-CREAM SCOOP.

Application filed May 1, 1922. Serial No. 557,502.

My invention relates to ice cream scoops of a particular design and the primary object is to provide means for cutting a layer of ice cream from the bulk container and in discharging the layer into a suitable container of a shape similar to that removed out of the bulk container by the scoop.

A further object of the invention is to provide means having parallel walls adapted to be forced into or penetrate the bulk ice cream and when removed to withdraw from the bulk of the ice cream a layer of the same which is discharged from the parallel sides of the scoop by a suitable ejecting means. The ejecting means may include the necessary elements to cause the layer to be readily discharged, when desired, out of the scoop and then into the container, and is moved into ejecting position in the act of filling the scoop with the ice cream. The side walls 11 are reduced in thickness at the sides and point thereof as shown in Figures 2 and 3.

My scoop is particularly adapted to be used with an ice cream confection where it is desired to fill the confection container with the ice cream in a convenient manner. Heretofore ice cream confections have been made and filled with ice cream at the factory making it necessary to keep the filled confection containers in a cooled place until they are sold to the consumer. This invention provides a scoop which is readily adaptable for use in removing from the bulk container the properly shaped amount of ice cream ready to be discharged into a confection container of a shape similar to the receiving portion of the scoop.

In the drawings forming part of this specification:

Fig. 1 is a sectional elevational view of my ice cream scoop.

Fig. 2 is a side elevation of a portion of the same.

Fig. 3 is an elevation of an alternative form of the scoop, part of which is illustrated in cross section.

Fig. 4 is a side elevation illustrated partly in cross section and part of which is broken away similar to the scoop shown in Figure 3.

Fig. 5 is a perspective view on a small scale of the confection container for the ice cream.

The drawings illustrate my scoop A in its entirety which is provided with a handle member B to which is secured in a suitable manner a tubular extension 10, which projects from the handle. At the outer end of the member 10 the ice cream scoop C is secured to rigidly support the same in connection with the handle B.

Scoop C consists of plate-like parallely extending side walls 11 which have sharp cutting edges 12 and pointed or piercing ends 13.

Within the scoop C is positioned platelike cutting knives 14 which are provided with a sharp edge 15 along one edge. The knives 14 are pivoted at 15 to the side walls 11 so as to hold the blade of the knife against the inner surface of the walls 11. The plates 14 are adapted to be operated by a finger or thumb lever 16 which is pivotally and slidably secured at 17 to the tubular member 10 at a point adjacent the handle B. Lever 16 is formed with a yoke portion 18 which extends about the tubular member 10 and is connected on one end with the operating lever 19 which is formed with a bifurcated end 20 so as to extend on either side of the walls 11 of the scoop and is pivotally secured at 21 to the blades or cutters 14. A suitable arcaded slot 22 is formed in each of the side walls 11 to permit the operation of the lever 16 to force the blades 14 downward into the position illustrated in dotted lines in Figure 1 to cause the blades 14 to scrape the inner surfaces of the walls 11 and to assist in discharging the ice cream between the walls when it is desired to empty the scoop C.

Ejecting plate 23 which is secured to the rod 24 in a manner to support the plate within the scoop C is adapted to be normally held in outer position illustrated in dotted lines in Figure 1 by the coil spring 25 which is positioned on the inner end of the rod 24 within the tubular member 10. A suitable stop or shoulder member 26 is secured by an adjusting screw to the rod 24 the position of which on the rod limits the movement of the plate 23 by engaging the shoulder 27 formed on the inner portion of the tube 10. The stop member 26 is formed with a projecting circular shoulder 28 which is engaged by the hook 29 which extends through the slot 30 of the member 10 and which is formed on the lever 16. The lever 16 is held in operating position by means of the spring 31 while a slot 32 formed in the lever allows the shoulder 28 to move the lever in a position so that the hook 29 will engage shoulder 28 when the plate 23 and rod 24 are forced backward into the position illustrated in full lines in Figure 1. By means of the adjustable stop 26 and the shoulder 27 which limits the inward movement of the same the inward movement of the ejecting plate 23 can be regulated. A suitable opening 33 is formed in the member 10 to allow the engagement of the screw which holds the shoulder member 26 in position on the rod 24. By setting the shoulder member 26 in different positions on the rod 24 the ejecting plate 23 can be held so that different sized cuts of ice cream can be made with the scoop C. The position illustrated on plate 23 in full lines in Figure 1 illustrates the maximum sizes of the cuts while dotted lines illustrate the smaller sizes which of course would only be that portion between the side walls 11 and the dotted position of the plate.

In use the scoop C is filled with ice cream by forcing the piercing ends 13 of walls 11 into the bulk of the ice cream within the container with engaging the handle B. As the same is being filled with the ice cream the plate 23 is forced into backward position so as to pack the ice cream between the walls 11. When the scoop C is filled it is turned to break the ice cream at the edges and withdrawn from the bulk. The scoop A is then ready to be held in position in the container to discharge the contents of the scoop.

The confection container which is applicable to be used with the form of scoop illustrated is shown in Figure 5 and this container D is formed of any suitable confection such as is used for ordinary cones which may be coated with chocolate or other candy confection or the entire receptacle can be made of a candy substance making a palatable ice cream confection. The container D is formed with an opening E which is practically the same size as the back plate 34 of the scoop C which supports the side walls 11 so that when it is desired to discharge the contents of the scoop C the pointed ends 13 are held in position directly above the opening E and releasing lever 16 is depressed which releases the ejecting plate 23 and simultaneously operates the arm 19 which causes the knives 14 to scrape and sever the ice cream from the sides 11 of the scoop allowing the ejecting plate 23 to be readily operated forwardly by the expansion of the spring 25. In discharging the contents of the scoop C the operation of the lever 16 immediately releases the catch hook 29 so that the spring 25 will function to inject the ice cream in the scoop.

In the scoop illustrated in Figures 3 and 4 the handle member B is adapted to support the projecting arm 35 to which is secured the ice cream scoop C which is similar in design to that illustrated in Figure 1 and is provided with side cutting walls 11. In this scoop the ejecting plate 23 is held in its inner position as illustrated in full lines in Figure 3 by means of the coil spring 36 which is positioned about the rear end of the plate supporting rod 37. A suitable supporting bracket 38 forms a guide and support for the rod 37 which extends through the back plate 34. A thumb engaging or operating end 39 is secured to the inner end of the rod 37 which is engaged by the thumb or finger in a manner to push or force the ejecting plate 23 into forward position as illustrated in dotted lines in Figure 3, to eject the ice cream between the side walls 11.

In use this ice cream scoop is forced into the bulk ice cream until the compartment between the side walls 11 is completely filled or packed with ice cream. The contents of the scoop can be readily discharged by engaging member 39 and forcing the discharging plate 23 forward while the container D is held in position to receive the ice cream contained in the scoop C.

The formation of the ice cream scoop A illustrated is identical in the preferred and alternative construction and forms a very desirable means for cutting a slice of ice cream with the shape similar to a cut of pie which can be discharged into the pie-shaped confection container D. This means of making up an ice cream confection to sell to the trade is very desirable because it provides an economical way of dispensing the ice cream making it possible to keep the bulk ice cream in the ordinary present form of containers and by means of my scoop the ice cream can be taken from the bulk and put into the container D and offered to the purchaser fresh, crisp, and in a palatable shape in a very economical manner. It is obvious that the shape of the sides 11 of the scoop can be of any suitable nature and the containers D of a form to suit the shape of the dispensing scoop. This form of providing an ice cream confection is most desirable and makes it more practical for the dealer to offer such a confection to his customers in a presentable manner without any danger of melting of the ice cream in warm weather until it has been removed from the bulk container and sold in the confection container to the customer. This is a very important feature of the invention and bears out the desirability of the ice cream scoop.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

I claim:—

1. An ice cream cutter including a cutter adapted to cut and receive a layer of ice cream, a handle member, means for supporting said cutter to said handle, and means for cutting ice cream from the walls of said cutter, means for ejecting the ice cream after it is free from adherence to said cutter.

2. An ice cream scoop comprising a handle, a supporting member extending from said handle, an ice cream scoop fixed to said supporting member having side walls, clearing knives pivoted to said side walls, means for operating said knives over the inner surface of said side walls, an ejecting member positioned within said scoop adapted to be moved into backward position by the ice cream packed into said scoop, and means for releasing and simultaneously operating the adjusting member and clearing knives.

3. An ice cream scoop comprising a pair of spaced sector shaped plates open along their converging edges, an arcuate end wall secured to said plates along their arcuate edges, a handle secured to said end wall and ejecting means positioned between said plates.

4. An ice cream scoop comprising a pair of spaced sector shaped plates open along their converging edges, an arcuate end wall secured to said plates along their arcuate edges, a handle secured to said end wall and an arcuate plunger positioned between said plates and normally lying against said arcuate wall.

5. An ice cream scoop comprising a pair of spaced sector shaped plates open along their converging edges, an arcuate wall secured to the said plates along their arcuate edges, an arcuate plunger normally positioned between said plates along said arcuate wall, a tubular supporting member secured to said arcuate wall, a handle attached to said tubular member, an ejecting rod secured to said plunger and slidable along said tubular support and means for operating said ejecting rod.

6. An ice cream scoop comprising a pair of sector shaped plates, a pair of cutting knives pivoted to said plates at one of the corners thereof, normally lying against the arcuate portions of said plates, a support secured to said scoop at the arcuate portion of said plate, a handle formed on said support and means secured to said handle for simultaneously swinging said cutting plates toward the vertex of said sector shaped plates.

In testimony whereof I affix my signature.

GEORGE T. PARR.